March 15, 1966  R. E. BELAU ET AL  3,240,161
VIBRATORY APPARATUS FOR MOVEMENT OF OBJECTS
Filed April 22, 1963  8 Sheets-Sheet 1
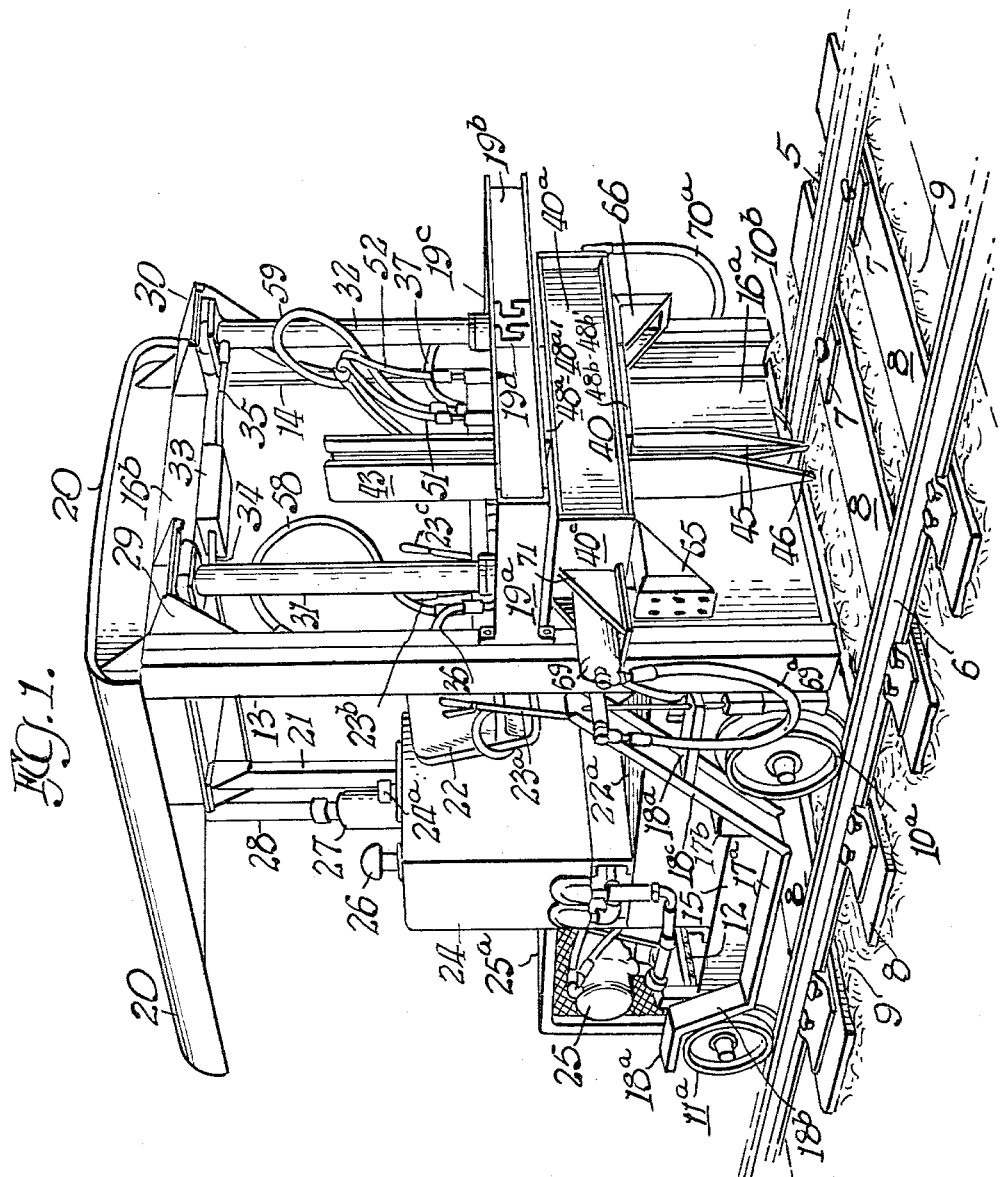

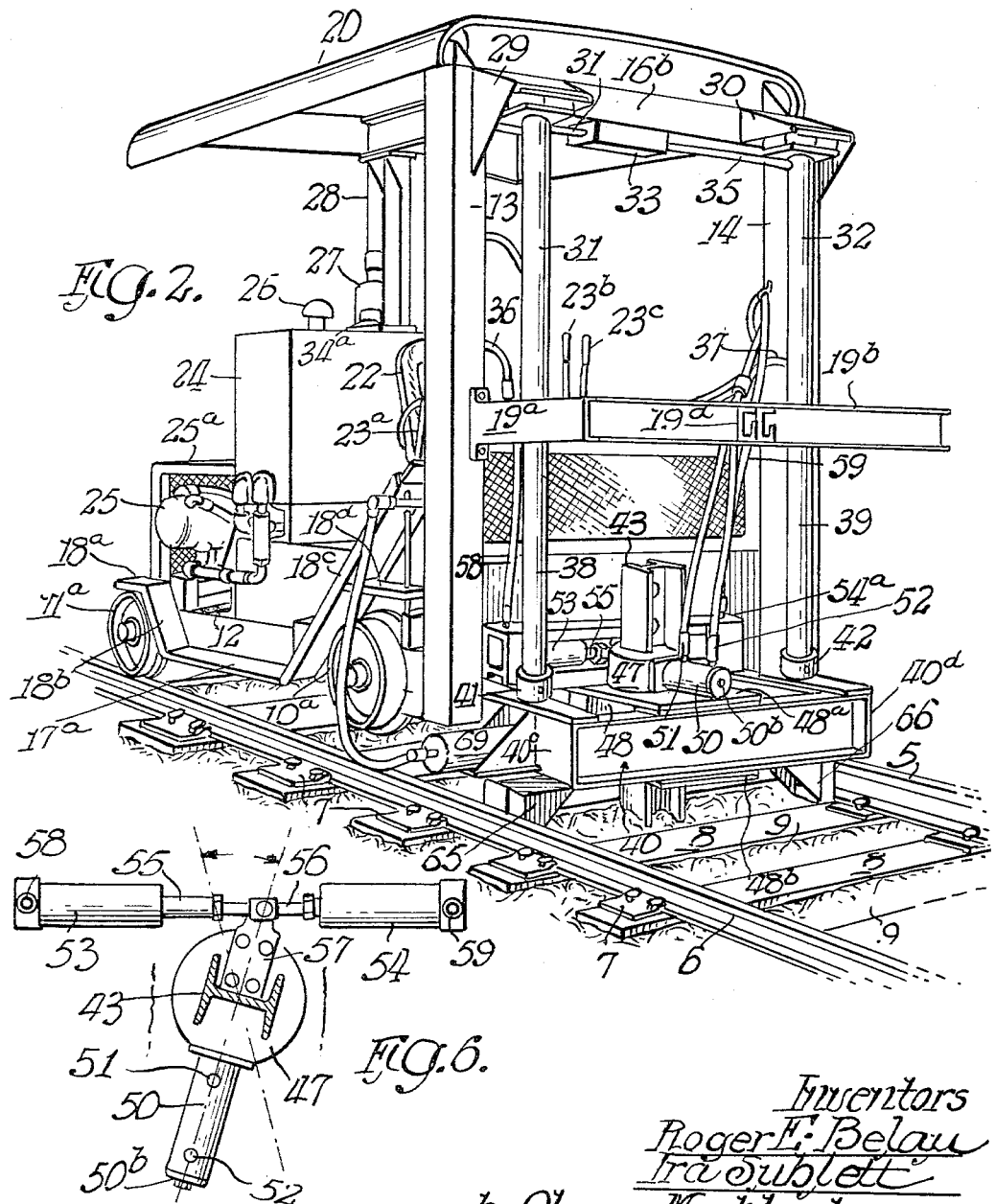

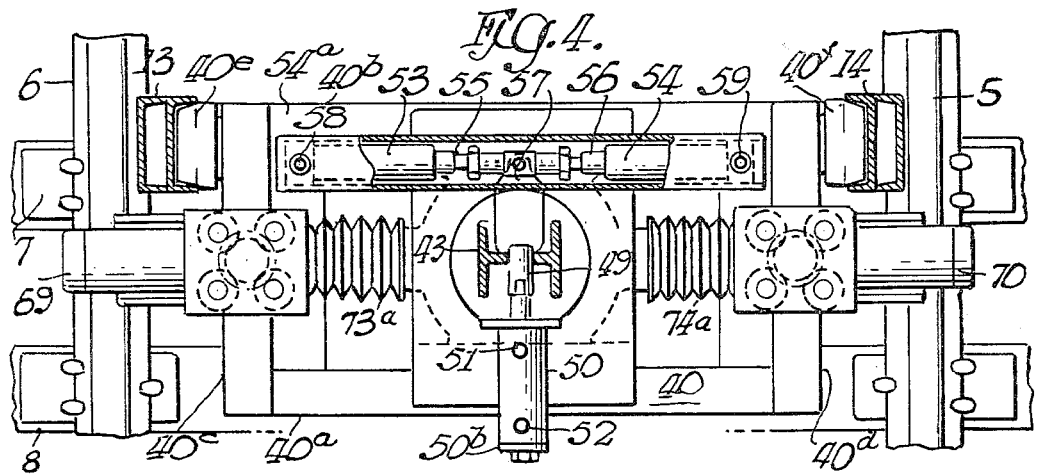

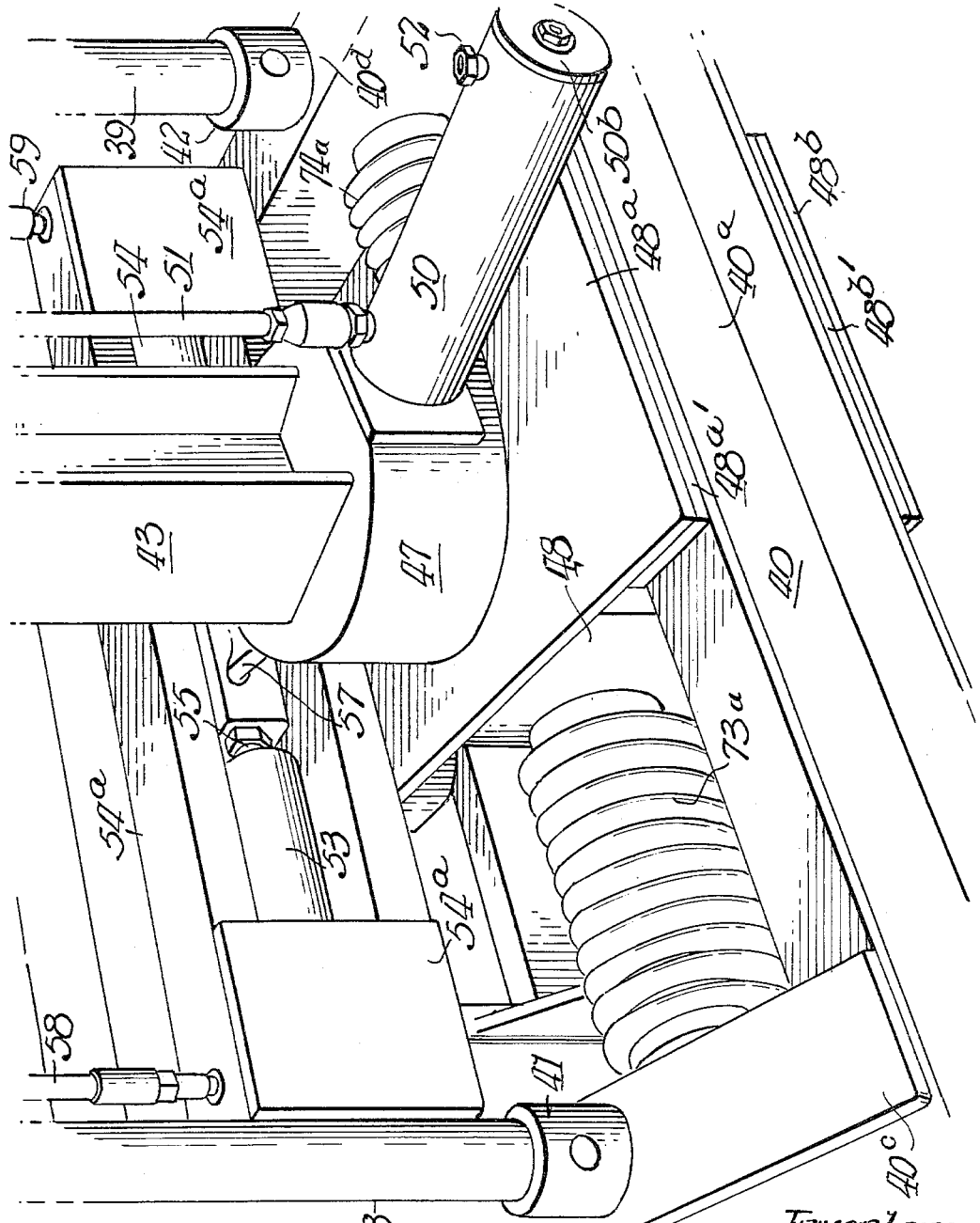

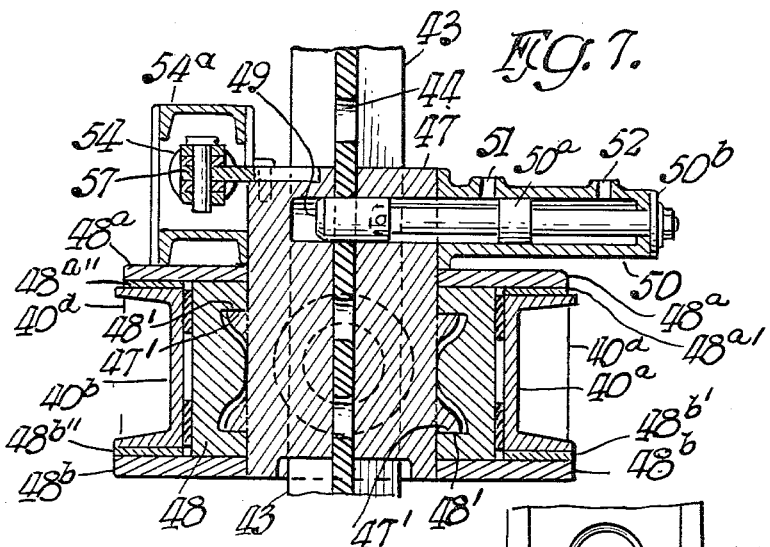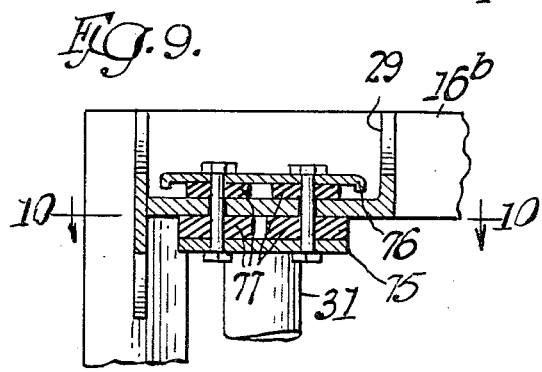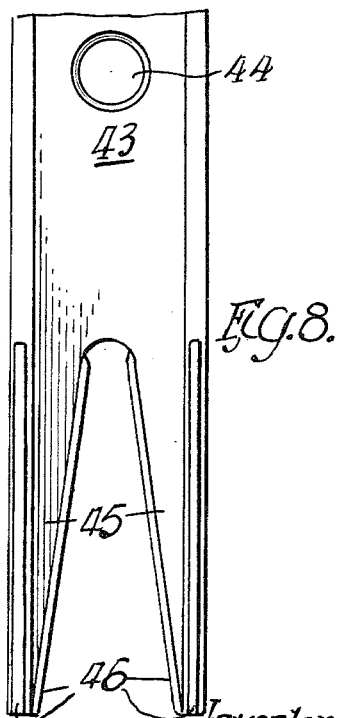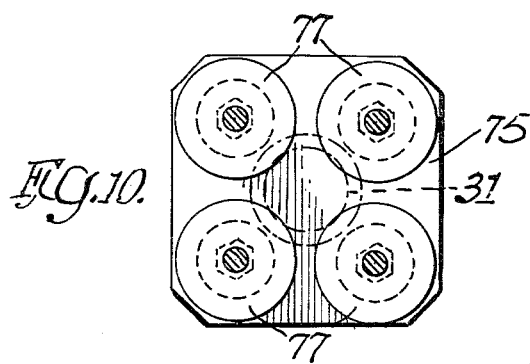

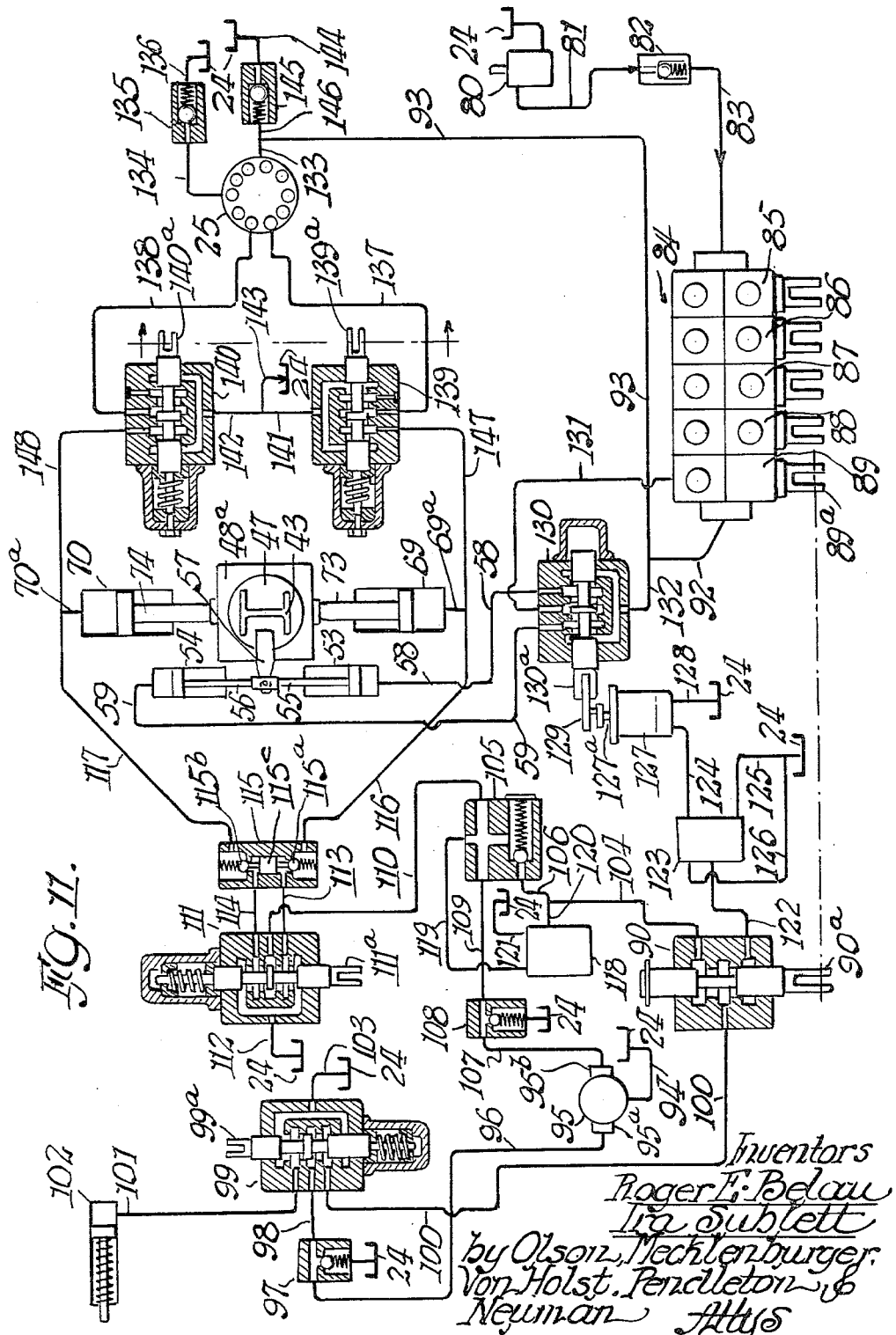

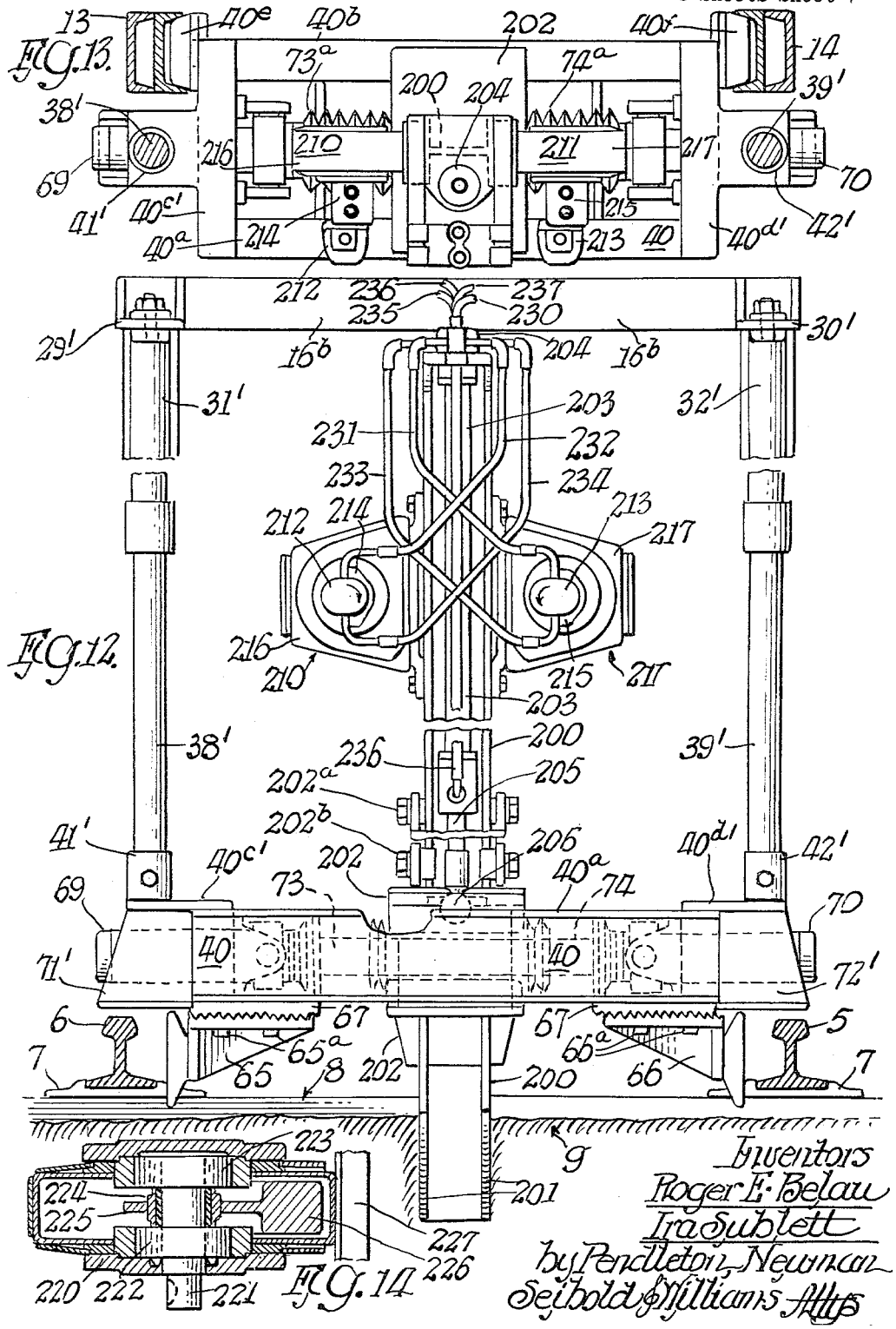

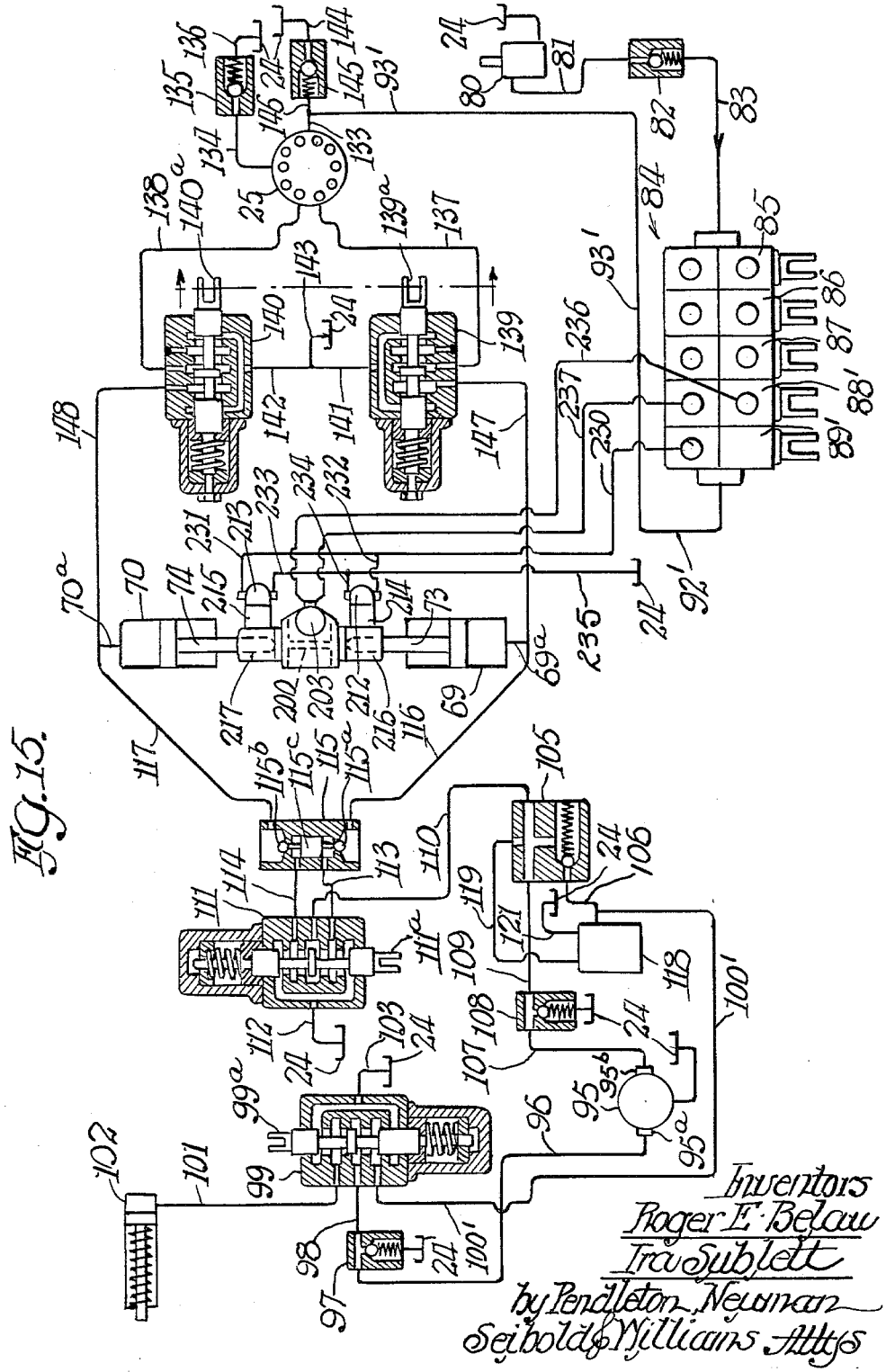

United States Patent Office 3,240,161
Patented Mar. 15, 1966

3,240,161
VIBRATORY APPARATUS FOR MOVEMENT
OF OBJECTS
Roger E. Belau and Ira Sublett, Fairmont, Minn., assignors to Fairmont Railway Motors, Inc., Fairmont, Minn., a corporation of Minnesota
Filed Apr. 22, 1963, Ser. No. 276,120
18 Claims. (Cl. 104—8)

This application is a continuation-in-part of our copending application Serial No. 213,387, filed July 30, 1962, now abandoned.

This invention relates to a method and apparatus for the movement and accurate placement of objects, particularly where the movement requires very substantial forces and must be accurately controlled and where, after movement, there is a tendency for the object to revert to its former position. More specifically, it relates to an apparatus which is capable of applying both non-pulsating and vibratory forces to break loose, move and resettle heavy objects with a minimum of "springback." Still more specifically, it relates in a particular embodiment to a method and apparatus which is advantageously employed in the railroad industry for the lining of railway track, said method and apparatus employing a combination of substantially non-pulsating forces and vibratory forces to break loose "cemented" track, to line same accurately and to set the track without undue disturbance or "springback."

The problems successfully solved by the present invention are readily illustrated in connection with the specific embodiment of the apparatus which is employed for lining railway track. While the invention is therefore described hereinafter in connection with its application to track lining, it should be understood that the invention is not necessarily limited thereto and has many other advantageous applications in the railroad industry as well as other industries.

Parallel railway track rails are usually spiked or otherwise secured to transverse ties, which are supported by ballast, usually in the form of loose rock. While the two rails may thus be secured rigidly and accurately to the ties, the rail and tie assembly as a whole is or sometimes becomes misaligned in a direction transverse to the rails. Such misalignment may result from a number of causes, e.g., errors in laying of the track; movement of the track during usage, particularly due to shifting of the ballast and/or as the result of cleaning, replacement or making additions thereto; and the like.

Correction for misalignment has historically required much hand labor with associated delays and high cost. Many devices have as a result been developed to mechanize this operation. Most take the form of force-resisting or anchoring means with hydraulically-powered force-applying or thrust means for mechanically pushing or pulling the track laterally to its desired position. While some of the devices have met with a measure of success, all suffer from one or more deficiencies which are successfully coped with by the present invention.

For example, the operation involves the shifting of the rail and tie assembly across the rock ballast. As a consequence, the ballast is usually unsettled and there is a tendency for the assembly to spring back, at least part ways, towards its former position. To compensate for this tendency, the assembly is sometimes shifted substantially beyond the desired position so that after springback it will approximate the desired location. Unfortunately, the eventuality and extent of springback is not always predictable. In addition, while initial springback is often observable at the time of the shift, vibratory forces resulting from subsequent track use brings about additional shifting, usually but not always towards the original position of the assembly.

Accordingly, to cope with this and other problems apparent from the detailed description hereinafter, it is an object of the present invention to provide a method and apparatus which are capable of applying the requisite heavy forces to effect the accurate shifting and placement of objects such as railway track and to settle them in place so that there is little tendency for further movement.

It is a further object of the present invention to provide an apparatus which is capable of independently applying non-pulsating and pulsating forces to effect movement of objects such as railway track, said forces being applied separately or in combination, as desired.

It is another object of the present invention to provide an apparatus for movement of objects by both non-pulsating and pulsating forces, wherein the magnitude of the pulsating forces when applied independently of the non-pulsating forces, exceed the magnitude of the pulsating forces when applied in combination with the non-pulsating forces.

It is another object of the present invention to provide an apparatus for movement of objects by both non-pulsating and pulsating forces, wherein the pulsating forces are uni-directional in the direction of the non-pulsating forces when combined therewith and are bi-directional when applied independently thereof.

It is still another object of the present invention to provide an apparatus for movement of objects wherein the rate of movement is automatically and inversely responsive to the forces required to effect same, e.g., a high rate of movement when the requisite forces are below a predetermined level and a reduced rate of movement when the requisite forces exceed said predetermined level.

It is still another object of the present invention to provide a method and apparatus for movement of objects relative to an anchoring element wherein both the placement of the anchoring element and movement of the object are effected by a combination of non-pulsating and pulsating vibratory forces.

These and other objects of the present invention will become apparent as a detailed description thereof proceeds.

To achieve these objects, a method and apparatus for applying non-pulsating and pulsating forces to objects is herewith provided. In a broad embodiment the apparatus comprises a force-resisting element or anchoring means in combination with a force-applying element or thrust means, which is movably connected to the force-resisting element. A first energy means such as a hydraulic power means is operatively interconnected between the force-resisting element and the force-applying element. When actuated, this first energy means applies a substantially non-pulsating force to the force-applying element so as to effect movement thereof. A second energy means or hydraulic power means is also operatively interconnected between the force-resisting element and the force-applying element. Upon actuation, the second energy means applies a pulsating force to said force-applying element to effect vibratory movement thereof. When either or both of the energy means are actuated, the resulting forces effect movement of objects in contact with the force-applying element.

In a preferred embodiment, the force-resisting or anchoring element is emplaced and may be removed by a combination of non-pulsating and pulsating vibratory forces. In this embodiment, the use of vibratory forces both during the emplacement of the anchor and during the movement of the object with respect thereto is highly advantageous, particularly in connection with track lining operations, as discussed hereinafter.

The drawings

With this broad description in mind, specific embodiments employed in the railroad industry for track lining are hereinafter described with particular reference to the accompanying drawings, which form a part of this specification, wherein:

FIGURE 1 is a perspective drawing of a railroad track liner employing one embodiment of the apparatus of the present invention, said track liner being shown as it is positioned on the track prior to imbedding its force-resisting element or anchoring shaft in the intertie ballast;

FIGURE 2 is another perspective view of the railroad track liner of FIGURE 1 after the anchoring means or spud has been imbedded in the intertie ballast, the forward portion, including the front wheels, raised from the rails, and the force-applying element or thrust shoes positioned to effect movement of the track assembly;

FIGURE 3 is a partially-cutaway elevation view of portions of the front of the track liner showing some of the essentials of the embodiment of the apparatus of the present invention shown in FIGURES 1 and 2;

FIGURE 4 is a partially-cutaway plan view thereof;

FIGURE 5 is a magnified perspective view of portions of the anchoring means and thrust means;

FIGURE 6 is a schematic view portraying one technique for imbedding the anchoring means in the intertie ballast, that is, by oscillation;

FIGURE 7 is a side section view illustrating further details of a portion of the anchoring means;

FIGURE 8 is a magnified view of the penetrating end of the anchoring shaft or spud;

FIGURES 9 and 10, the latter being a section view at line 10—10 of FIGURE 9, show details of the upper supports for the hydraulic cylinders which raise and lower the lining assembly with respect to the self-propelled vehicle, said upper supports being resiliently mounted;

FIGURE 11 shows in schematic form the hydraulic circuitry of the embodiment of the present invention shown in FIGURES 1-10, as well as the circuitry associated with some of the auxiliary apparatus;

FIGURE 12 is an elevation view of a portion of the front of a railroad track liner portraying an alternative technique for imbedding the anchoring means in the intertie ballast; that is, by vibration in contrast to oscillation technique of FIGURES 1-11;

FIGURE 13 is a plan view, partly in section, of a portion of the embodiment of FIGURE 12;

FIGURE 14 is a section view of one type of vibrator which may be used in the embodiment of FIGURES 12 and 13; and FIGURE 15 shows in schematic form the hydraulic circuitry of the embodiment of the present invention shown in FIGURES 12-14, as well as the circuitry associated with some of the auxiliary apparatus.

General description of track liner of FIGURES 1-11

Referring specifically to FIGURES 1 and 2, the track liner of the embodiment illustrated comprises a self-propelled vehicle on spaced rails 5 and 6, which are spiked to conventional shouldered tie plates 7 and ties 8, which are in turn supported by rock ballast 9. The track liner is propelled on wheel and axle assemblies 10a–10b and 11a–11b, 11b being hidden in these views, said wheels being driven by a conventional hydraulic motor (hidden) via chain drives, e.g., chain drive 12. The vehicle comprises vertical structural members 13 and 14 at the front, horizontal structural members at the sides, such as 15, and other members hidden in this perspective view, and cross members such as 16a and 16b and other cross members also hidden.

Auxiliary elements include, for example, running board 17a, footstep 17b, fender assemblies 18a–18d and protective structural assembly 19a–19c, which is mounted on structural members 13 and 14 and extends forward of the vehicle to provide protection and a rigid mounting for conventional alignment gauge devices (not a part of this invention) which may be attached at bracket 19d. The vehicle is covered by reinforced roof assembly 20 which is supported at the front by vertical members 13 and 14 and at the rear by the centrally-located vertical structural member 21. The track liner as a whole may be raised from the tracks for turning or setoffs by means of a hydraulic lifting jack (hidden) located underneath the vehicle at the approximate center of gravity.

The operator normally sits in seat 22 which is mounted on platform 22a behind control handles 23a, 23b, 23c, etc., and foot pedals (hidden). In back of the operator's seat 22 is tank 24, including filler-vent 24a, said tank serving as the primary reservoir for the hydraulic fluid employed in the hydraulic systems of the apparatus. The hydraulic circuitry includes, for example, hydraulic pump 25 housed within protective cage 25a, and associated connecting hydraulic lines, valves and the like. While portions of some of the hydraulic lines and valves are shown in several of the figures, they are not necessarily numbered or specifically discussed. Instead, the hydraulic circuitry, as it pertains to the embodiment of the present invention shown in FIGURES 1-10, is presented in schematic form for greater clarity in FIGURE 11, to be discussed in detail hereinafter. Similarly, the hydraulic circuitry as it pertains to the embodiment shown in FIGURES 12-14, is presented in schematic form in FIGURE 15, also to be discussed in detail hereinafter.

Power for running the hydraulic pumps and the like is supplied either directly through flexible couplings or via conventional belt drives from a primary power source, e.g., a gasoline or diesel-powered engine, which in this embodiment is mounted at the rear of the vehicle and is hidden in FIGURES 1 and 2 behind reservoir 24. Intake air for the engine is introduced via conventional inlet assembly 26, and the exhaust gases exit via muffler 27 and vertical exhaust stack 28.

Mounted on vertical members 13 and 14 and cross member 16b are supports 29 and 30 for double-acting hydraulic cylinders 31 and 32, respectively. The pistons within cylinders 31 and 32 are driven downward by hydraulic fluid introduced via junction block 33 and hydraulic lines 34 and 35, respectively. Similarly, the pistons are driven upward by means of hydraulic fluid introduced via a flow divider (hidden) and hydraulic lines 36 and 37, respectively.

The extremities of piston rods 38 and 39 of the pistons in cylinders 31 and 32, respectively, are secured to rectangular frame 40 by means of holders 41 and 42, respectively. Rectangular frame 40, which includes cross members 40a and 40b and side members 40c and 40d as shown in FIGURE 4, serves as a carrier for the anchoring means and thrust means to be discussed hereinafter. It is slidably mounted for vertical movement by means of side guides 40e and 40f which extend into the inward-facing channels of structural members 13 and 14, respectively. Accordingly, carrier 40 with accompanying apparatus may be raised or lowered as a unit by actuating the piston-cylinder assemblies 31 and 32, previously described.

Referring to FIGURES 1 through 8, the force-resisting means or anchoring means, which is slidably supported on carrier 40 for lateral relative movement with respect thereto, comprises a vertical shaft or spud 43, which in this embodiment is a high strength alloy steel H-section having circular apertures 44 at spaced intervals in the web thereof and a bifurcated pointed extremity 45 to facilitate the penetration of spud 43 into the intertie ballast. To improve abrasion resistance, wearing surfaces 46 of bifurcated pointed extremity 45 are hard faced.

Anchoring spud 43 is movably mounted for vertical adjustment within cylindrical-type guide 47, which in turn is mounted for oscillatory movement within collar 48. Collar 48 in turn is slidably mounted on frame 40 and also has internal bearing surfaces 48' which register with corresponding bearing surfaces 47' on guide 47, thereby permitting oscillatory movement of the guide and the spud relative to collar 48. Collar 48 is slidably mounted on frame 40 by means of upper plate 48a and lower plate 48b, the forward and rearward bearing surfaces of each of which, e.g., 48a', 48a'', 48b' and 48b'', slidably engage the horizontal upper and lower surfaces of cross members 40a and 40b of frame 40. Other structural details, not of themselves part of the present invention, are shown in FIGURE 7. Accordingly, frame 40 and associated structures may be moved laterally relative to spud 43, guide 47, collar 48 and associated structures.

The vertical position of spud 43 within guide 47 is adjustable by hydraulically inserting pin 49 into any selected one of the circular apertures 44. Pin 49 is inserted into or withdrawn from apertures 44 by the action of piston 50a of double-acting hydraulic piston-cylinder unit 50, to which it is pivotally secured. Piston 50a has a double rod, one being attached to pin 49 and the other being attached to indicator plate 50b. Hence the operator can, by checking the position of indicator plate 50b, ascertain if pin 49 has been properly inserted in one of holes 44 so as to engage spud 43. Hydraulic fluid is supplied piston-cylinder unit 50 by hydraulic lines 51 and 52, which may include connecting swivel joints. Accordingly, the length of spud 43 extending below laterally-slidable carrier 40 can be readily adjusted, as desired.

Spud 43 is imbedded in the intertie ballast by lowering carrier 40 until the bifurcated end 45 contacts ballast 9 and thereafter forcing spud 43 down through the ballast until sufficient length is imbedded to act as an anchor with respect to lateral forces to be employed for moving the track assembly. As shown in FIGURE 2, the entire weight of the forward part of the vehicle is used to force spud 43 through the ballast by actuating hydraulic rams 31 and 32 until front wheels 10a and 10b are lifted as much as 6 to 12 inches or more above the rails. In addition to the vertical forces, the spud may be rotated, oscillated, vibrated, impact-driven or otherwise agitated so as to work it down through the rock ballast. In the embodiment illustrated in FIGURES 1–11, oscillatory movement is employed; in the embodiment of FIGURES 12–15, to be discussed hereinafter, vertical vibratory movement is employed.

The oscillatory movement of the embodiment of FIGURES 1–11 is imparted by oscillating the guide 47 and spud 43 back and forth through an arc totaling, for example, about 30°. This oscillatory movement is achieved by single-acting hydraulic cylinders 53 and 54 mounted within frame 54a, which is rigidly secured atop and at the rear of collar plate 48a and forms part of the anchoring means. The piston rods or rams 55 and 56 of cylinders 53 and 54, respectively, are operatively connected via a trunnion arrangement to arm 57, which extends from guide 47. Accordingly, as hydraulic fluid is alternately supplied to cylinders 53 and 54 via hydraulic lines 58 and 59, respectively, arm 57, guide 47 and spud 43 are oscillated through the desired arc.

If the rams 38 and 39 of cylinders 31 and 32 are fully extended before spud 43 reaches sufficient depth to provide an adequate anchor, another "bite" may be taken on spud 43 by withdrawing pin 49 from one of the lower apertures 44 in spud 43 and raising carrier 40 by means of cylinders 31 and 32 so that pin 49 may be inserted in a higher one of apertures 44. Hence, the effective anchoring depth is not limited to the length of rams 38 and 39. Since in practice it is not unusual to take advantage of this additional flexibility, the engaging edges of apertures 44 and pin 49 are suitably beveled so as to effect rapid self-centering or self-aligning engagements. Thus, when taking another "bite" on the spud 43, carrier 40 need only be approximately positioned in order for pin 49 to properly center itself within the selected one of apertures 44.

For the track-lining operation, spud 43 must be adequately imbedded in the intertie ballast, as previously indicated. In addition, the stroke of piston rods or rams 38 and 39 must be correlated with the position of spud 43 in guide 47 so that the forward part of the vehicle is raised sufficiently for wheels 10a and 10b to clear rails 5 and 6, whereby the entire weight of the vehicle is supported by rear wheels 11a and 11b (hidden) as pivot points and by spud 43. At the same time, carrier 40 must be in a low enough position so that the force-applying surfaces or thrust shoes 65 and 66, which are secured thereto intermediate the rails, are laterally engageable with the base flanges of the rails.

For flexibility, the distance between shoes 65 and 66 is adjustable by loosening the bolts 65a and 66a which secure the shoes to the underside of carrier 40. Hence, the distance between the shoes may be increased or decreased as desired. To prevent any possibility of slippage under heavy loads, the upper surface of shoes 65 and 66 and the lower respective contacting surfaces 67 and 68 of carrier 40 are grooved, channeled or otherwise lined so as to mesh or otherwise register with each other when the securing bolts are tightened, as shown in FIGURE 3.

Carrier 40 and the forward part of the track liner are moved laterally (actually an arc-like movement centered at the rear wheels 11a–11b as pivot points) with respect to the anchoring assembly, i.e., spud 43, guide 47, collar 48, frame 54A and associated structures, by means of single-acting hydraulic cylinders 69 and 70 housed within lateral extensions 71 and 72 on carrier 40. The inner extremities of the piston rods 73 and 74 (hidden except in FIGURE 11) of cylinders 69 and 70 bear against collar 48 and are enclosed within bellows-type extensible shields 73a and 74a, respectively, for protection. Hence, when hydraulic fluid is supplied to either cylinder 69 or cylinder 70 via hydraulic lines 69a or 70a, respectively, relative lateral movement results between carrier 40 and the anchoring assembly. As previously indicated, this relative lateral movement is possible because carrier 40 and the anchoring assembly are in horizontal sliding engagement. One of the advantageous features of this embodiment of the present invention is the fact that this truly-horizontal movement does not, as is the case, in some prior-art apparatuses, tend to lift the rail assembly as it is aligned.

It is apparent from consideration of the geometry of the structure of the track liner that movement of frame 40 laterally with respect to the anchoring assembly and the movement of the vehicle pivotally on its rear wheels may possibly result in slight twisting forces at the point where cylinders 31 and 32 are secured to supports 29 and 30. Accordingly, this is compensated for by securing the cylinders to the supports resiliently. As shown in FIGURES 9 and 10, this is accomplished by bolting cylinder 31 to mounting 29 by means of upper and lower securing plates 75 and 76, which are spaced from mounting 29 by means of multiple rubber discs 77. The resilient rubber mounting also has the important function of shock insulating the respective structures from one another. The advantage of this feature becomes quite apparent when the vibratory circuit is actuated.

As previously indicated, an essential feature of the present invention is the ability to apply both non-pulsating and pulsating forces and combinations thereof so as to effect the desired relative lateral movement between frame 40 and the anchoring means and their respective associated structures for the lining operation. When such movement is effected, the whole forward part of the vehicle pivots with frame 40 about the rear wheels while the anchoring means remains stationary.

In its practical application, hydraulic fluid is supplied to cylinders 69 or 70 so as to move frame 40 relative to the imbedded spud 43 thereby bringing either thrust shoe 65 or 66 in contact with rails 6 or 5, respectively, depending upon the direction of desired alignment. When the shoe contacts the base flange of the rail, tremendous forces, e.g., 30,000–60,000 pounds, are available, if necessary, for transmission to the rail so as to shift the rail assembly as a whole.

As aforementioned, a unique feature of this invention is the capability of applying, in addition to non-pulsating lateral forces, pulsating lateral forces which assist in breaking loose "cemented" rail assemblies and resettling them in the desired position. The application of pulsating or vibratory forces minimizes the incipient tendency for the assembly to revert to the former position. In short, the application of vibratory forces permits the accurate lining of the track without need for overthrows to compensate for anticipated springback and without the errors otherwise associated therewith.

The hydraulic circuitry of FIGURE 11

The hydraulic circuitry of the embodiment of FIGURES 1–10, which permits the advantageous application of both non-pulsating and pulsating forces to the rail assembly, is shown schematically in FIGURE 11. FIGURE 11 also shows the circuitry for braking the vehicle and for the oscillatory movement employed for imbedding the spud. Where feasible, the same numbers are employed in the schematic of FIGURE 11 as were employed in the previous figures. While a cup-shaped symbol for reservoir 24 is employed at a number of different locations for convenience of illustration in FIGURE 11, it should be understood that all such symbols refer to the single common reservoir 24.

Throughout the description of the hydraulic circuitry, both hereinabove and hereinafter, reference is made, for simplicity, to the provision of hydraulic fluid under pulsating or non-pulsating pressures. It should be recognized, however, that it is the pulsating or non-pulsating "flow" of hydraulic fluid which is actually provided; and the pressures result only when resistance to such flow is met. Such concept should be kept in mind throughout the description.

The lining and vibratory circuits are two interconnected circuits transmitting non-pulsating and pulsating pressures into the same hydraulic cylinders 69 and 70. In the following description, the lining circuit is explained first, followed by the vibratory circuit, and then the two circuits working simultaneously. In addition, where appropriate, references are also made to other hydraulic circuits associated with the track liner, including the aforementioned braking and oscillatory circuits. While specific values for pressures, rates of flow and the like are mentioned in this description, such values are purely illustrative and not limiting and are employed merely to establish relative relationships which may exist and/or to render the description more "concrete."

In FIGURE 11 hydraulic fluid is applied from reservoir 24 to the main circuit pump 80, which may be a vane-type hydraulic pump which is belt driven by the primary power source. Hydraulic fluid therefrom which is limited by suitable pressure-relief means to about 2000 p.s.i., flows via line 81, check valve 82 and line 83 into main circuit multiple spool valve 84. Section 85 thereof controls hydraulic fluid to the propulsion motor for the track liner. Section 86 controls hydraulic fluid to the turntable which, as previously mentioned, is the means for jacking up the whole vehicle for turning and offsets. Section 87 controls the hydraulic fluid to lifting cylinders 31 and 32, said cylinders, as previously described, controlling the vertical movement of carrier 40. Section 88 provides hydraulic fluid to cylinder 50 which controls the insertion and removal of pin 49 from the apertures 44 in spud 43. Section 89 along with the selector valve 90, the spool controls 89a and 90a of which are actuated in unison, together control the flow of hydraulic fluid to the oscillatory circuit to be described hereinafter. Hydraulic fluid leaves multiple spool valve 84 via line 92 and enters the vibratory circuit via line 93, said vibratory circuit also to be described hereinafter.

The spool-type valves referred to in this description and drawings are of conventional design, the exact configuration thereof in each case depending upon the desired function. Such valves are well known to those skilled in the art and need not be described in detail other than in functional terms.

The lining circuit is supplied with hydraulic fluid from reservoir 24 via line 94 and conventional split-flow pump 95 having a pressure rating of about 6000 p.s.i. at the rate of about 3.5 gallons per minute from each port 95a and 95b, or a total of about 7 gallons per minute. Starting with port 95a, the normal flow of hydraulic fluid is through line 96 into relief valve 97, which is pre-set at about 1200 p.s.i. Hydraulic fluid leaves relief valve 97 via line 98 and enters spool-type brake valve 99. In the neutral position, the hydraulic fluid merely circulates through brake valve 99 and leaves via line 100. If the spool 99a of brake valve 99 is actuated (by pushing downward in FIGURE 11) the hydraulic fluid is directed via line 101 to brake cylinder 102, which applies the brakes to the vehicle. When the brakes are released, the spring-loaded piston in cylinder 102 forces hydraulic fluid back to reservoir 24 via line 101, brake valve 99 and line 103.

When brake valve 99 is not actuated, the fluid leaving via line 100 enters spool-type selector valve 90. If selector valve 90 is not actuated, the hydraulic fluid leaves via line 104 and enters junction block 105 via line 106. Junction block 105 has in its lower section a built-in check valve set at about 3 to 5 p.s.i.

In junction block 105 the hydraulic fluid from line 106, which, as aforementioned is at the rate of about 3.5 gallons per minute, is joined by additional hydraulic fluid, also at the rate of about 3.5 gallons per minute, which flows from pump 95 via port 95b, line 107, relief valve 108 and line 109. Relief valve 108 is set at about 3500 p.s.i. The combined flow of 7 gallons per minute leaves junction block 105 via line 110 and enters spool-type lining valve 111. If spool 111a of lining valve 111 is not actuated, the total flow of 7 gallons per minute leaves lining valve 111 via line 112 and returns to reservoir 24.

Spool 111a of lining valve 111 may be actuated in either direction thereby directing the hydraulic fluid out via either line 112 or line 114, the particular line depending upon the direction of actuation and the desired direction of lining. The configuration of the spool of valve 111 is such that if hydraulic fluid is directed out via line 113, line 114 is connected via the valve to line 112 and reservoir 24. Similarly, if the fluid is directed out via line 114, line 113 is connected via the valve to line 112 and reservoir 24.

The hydraulic fluid which leaves valve 111 via line 113 or line 114 then enters lock valve 115 wherein the pressure of the hydraulic fluid forces one of the balls 115a or 115b, respectively, off its seat, simultaneously moving piston 115c in the opposite direction so as to unseat the opposite ball. The hydraulic fluid entering via line 113 or line 114 is then free to pass, respectively, via lines 116 and 69a to cylinder 69 or via lines 117 and 70a to cylinder 70. It will be noted that as the hydraulic fluid from pump 95 is directed via the connecting circuitry just described to either cylinder 69 or cylinder 70, hydraulic fluid in the opposing cylinder is readily displaced therefrom because that cylinder is simultaneously connected to reservoir 24 via the corresponding section of lock valve 115, lining valve 111, line 112 and other connecting lines.

For example, if spool 111a is moved upward in FIGURE 11, the hydraulic fluid which would normally be leaving lining valve 111 via 112 is diverted so as to leave via line 113. When the fluid enters the lower section of lock valve 115, it forces ball 115a downward off its seat and simultaneously forces piston 115c upward in the opposite direction so as to unseat ball 115b. The hydraulic fluid then flows via lines 116 and 69a into cylinder 69 causing movement of cylinders 69 and 70 and associated structures relative to the anchoring means, including spud 43, guide 47, plate 48a, oscillatory cylinders 53 and 54 and associated structures.

Since the anchoring means is immovable when spud 43 is imbedded in the intertie ballast, the relative movement takes the form of actual movement of cylinders 69 and 70 and associated structures, including carrier 40, thrust shoes 65 and 66 and the forward part of the vehicle. This movement in FIGURE 11 would be in a downward direction. Hydraulic fluid would accordingly be simultaneously displaced from cylinder 70 and would leave via lines 70a and 117, the upper section of lock valve 115, wherein ball 115b has already been unseated, line 114, lining valve 111 and line 112 to reservoir 24.

One of the features of this embodiment of the present invention is the fact that the rate of flow of hydraulic fluid to cylinders 69 or 70 is inversely responsive to the forces required to effect movement relative to the anchoring assembly. Thus, as resistance increases above a predetermined level, the rate of flow of hydraulic fluid and thus rate of relative movement, decreases. This permits the operator to quickly bring the thrust shoes against the rail and initiate movement thereof; but as the resisting forces build up, the rate of movement decreases so that the operator may more accurately stop the movement at the right point and thereby avoid excessive overthrow.

This is accomplished by inserting unloading valve 118 into the hydraulic circuitry. Such unloading valves are commerically available, e.g., from Dynex Inc., 777 Dynex Drive, Pewaukee, Wisconsin, and are well known to those skilled in the art.

The operation of unloading valve 118 is such that when the requisite pressure in cylinder 69 or 70 to effect lining builds up to a predetermined level, e.g., about 1000 p.s.i., said pressure being reflected back throughout the hydraulic system, unloading valve 118 detects such pressure via line 119 and connects line 120 to reservoir 24 via line 121. When line 120 is thus connected to reservoir 24, the 3.5 gallons per minute of hydraulic fluid previously flowing from line 104 to junction block 105 via line 106 is bypassed to the reservoir. At the same time, the remaining 3.5 gallons per minute entering junction block 105 via line 109 is blocked from reservoir 24 because of the action of the check valve in the lower section of junction block 105. Accordingly, until hydraulic pressure builds up in cylinder 69 or cylinder 70 to about 1000 p.s.i., hydraulic fluid is fed to the cylinder at the rate of 7 gallons per minute. Once the pressure exceeds about 1000 p.s.i., half the hydraulic fluid is bypassed via unloading valve 118 so that the rate of flow and thus relative movement of the cylinders with respect to the anchoring means is cut in half.

As previously indicated, lining pump 95 supplies hydraulic fluid to operate brake cylinder 105 when brake valve 99 is actuated. In addition, in this embodiment lining pump 95 also supplies hydraulic fluid to the oscillatory circuit. As also previously indicated, in this embodiment the oscillator circuit is employed to imbed spud 43 in the intertie ballast prior to any actuation of the lining and vibratory circuits. The oscillatory circuit is energized when spool 89a of valve 89 and spool 90a of valve 90 are simultaneously actuated, whereby two flows of hydraulic fluid are directed to the oscillatory circuit.

The first flow is the 3.5 gallons per minute of hydraulic fluid which enters selector valve 90 via line 100. Instead of leaving selector valve 90 via line 104 as previously described, it leaves via line 122 and enters conventional flow regulator or divider 123, wherein a constant flow of 3 gallons per minute is diverted to line 124 and the remainder to reservoir 24 via line 125. Flow divider 124 also has a built-in relief valve exhausting via line 126 to reservoir 24, whereby pressure is limited to a maximum of about 1000 p.s.i. Flow regulators of the type employed at this point are commercially available, e.g., from the Gresen Manufacturing Company, Minneapolis, Minnesota, and are well known to those skilled in the art.

The resulting pressure-controlled flow of 3 gallons per minute is sent via line 124 to fluid motor and speed reducer 127, the output shaft 127a therefrom rotating it about 94 revolutions per minute. Exhaust hydraulic fluid from the fluid motor enters reservoir 24 via line 128. A mechanical linkage 129 exists between the output shaft 127a and spool-type oscillating valve 130 whereby the spool 130a thereof is actuated back and forth at the rate of about 94 cycles per minute.

The second flow of hydraulic fluid to the oscillatory circuit arrives via spool valve 89. When spool valve 89 is actuated at the same time as spool valve 90, hydraulic fluid flows via line 131 to oscillating valve 130. Accordingly, as spool 130a is oscillated back and forth within valve 130, the hydraulic fluid from line 131 is directed alternately to lines 58 and 59, thereby actuating cylinders 53 and 54 alternately. Effluent hydraulic fluid is returned, alternately from cylinders 53 and 54, to reservoir 24 via the respective lines 58 or 59, valve 130 and lines 132, 93, 133, vibratory pump 25, line 134, check valve 135 and line 136.

Prior to actuation of the vibratory circuit, the hydraulic fluid employed therein flows from reservoir 24 through the circuit and back to reservoir 24 via pump 80, line 81, check valve 82, line 83, multiple valve 84, lines 92, 93 and 133, pump 25, lines 137 and 138, vibratory valves 139 and 140, and lines 141, 142 and 143.

Vibratory pump 25 in this embodiment is a conventional ten-piston hydraulic pump which is directly driven through flexible couplings from the primary power source. Such pumps are commercially available, e.g., from Dynex Inc., 777 Dynex Drive, Pewaukee, Wisconsin, and are well known by those skilled in the art.

In FIGURE 11, the lower five pistons of pump 25 are connected to line 137 and the upper five pistons are connected to line 138. Accordingly, during half of a revolution the lower five pistons will discharge fluid into line 137 as the upper five pistons receive fluid from line 138. During the second half of a revolution, the situation is reversed, that is, the upper five pistons deliver fluid to line 138 while the lower five pistons receive hydraulic fluid from line 137. This means that for every 360° of pump rotation a small amount of hydraulic oil is alternately sent to each hydraulic line and the same amount is alternately received from each line.

Because air will compress, it must be kept out of the hydraulic lines. Accordingly, hydraulic fluid is delivered to pump 25 via lines 93 and 133 at a higher rate than vibratory pump can pump it. The excess flow is diverted via line 134, check valve 135 and line 136 to reservoir 24. Check valve 135 typically has an opening pressure of 20–25 p.s.i. So as to assure constant flow to vibrator pump 25, which would be damaged due to cavitation effects if hydraulic fluid were not supplied continuously thereto, a second supply line directly from reservoir 24 is provided via line 144, check valve 145 and line 146. Thus, if pump 80 should fail, vibrator pump 25 could still draw directly from reservoir 24. Check valve 145 assures that hydraulic fluid from line 93 does not bypass pump 25.

To supply pulsating flows to cylinders 69 and 70, the spool-type vibrator valves 139 and 140 are simultaneously actuated by moving spools 139a and 140a to the right in FIGURE 11. When so actuated, the alternate pulses of hydraulic fluid in lines 137 and 138 which were previously diverted via lines 141 and 142 alternately and line 143 to reservoir 24, are connected to lines 147 and 148 and thereby via lines 69a and 70a to cylinders 69 and 70, respectively.

Since the same cylinders 69 and 70 are used for both lining and vibrating, separately and in combination, the two circuits must be capable of separation. This is accomplished by means of lock valve 115 and the design of vibrator valves 139 and 140, a portion of each of which serves the same function as a lock valve.

When lining only, hydraulic fluid cannot flow to the right in FIGURE 11 beyond cylinders 69 and 70 because the spools 139a and 140a of vibrator valves 139 and 140 prevent flow of hydraulic fluid from lines 147 and 148 into the vibrator valves. Similarly, when vibrating only, hydraulic fluid cannot flow to the left in FIGURE 11 beyond cylinders 69 and 70 because the seated balls of lock valve 115 prevent flow of hydraulic fluid from lines 116 and 117 into the lining valve 111. In effect, the hydraulic circuits for lining and vibrating are hydraulically isolated from each other except when both lining valve 111 and vibrator valves 139 and 140 are actuated.

As is apparent from the previous description, hydraulic fluid from pump 95 for the lining operation enters cylinder 69 or cylinder 70, depending on the direction of desired throw, at the rate of 7 gallons per minute until the required lining forces necessitate cylinder pressures in excess of 1000 p.s.i. At pressure levels in excess of about 1000 p.s.i. (which corresponds to a force at thrust shoes 65 or 66 of about 12,500 pounds) half of the hydraulic fluid is bypassed to reservoir 24 via line 120, unloading valve 118 and line 121. Hydraulic oil continues to enter cylinder 69 or cylinder 70 but at the reduced rate of about 3.5 gallons per minute until the lining operation is complete and the spool of valve 111 is returned to the neutral or off position. In the off position the hydraulic fluid from pump 95 is returned to reservoir 24 via valve 111 and line 112, as previously described.

Maximum available hydraulic pressures in the lining circuit are determined by the capability of pump 95 or, more usually, by the setting of relief valve 108, which, as aforementioned, is set in this specific illustration at 3500 p.s.i. If such pressure level in cylinders 69 or 70, which would correspond to a force of about 44,000 pounds at thrust shoes 65 or 66, is inadequate to accomplish the desired lining, particularly the initial breaking loose of the track assembly, the vibratory circuit, in combination with the lining circuit (or even alone under some circumstances) can be resorted to for such purpose.

Pressures available at cylinders 69 and 70 when the vibratory circuit alone is actuated depend in part upon the pressure rating of vibratory pump 25. In a particular embodiment the maximum values of the alternate pressures pulses at the two outputs of pump 25 may be in the range of about 5000 to 6000 p.s.i. and the pump speed may be about 1900 cycles per minute (or higher or lower, if desired), resulting in alternate flow pulses in lines 137 and 138 at such rate. If the spools 139a and 140a of valves 139 and 140 are actuated so as to direct the flow pulses alternately to cylinders 69 and 70, respectively, which cylinders are both rigidly secured to carrier 40, the volumes of hydraulic fluid is sufficient to move the cylinders and associated structure about 1/16" in one direction and then about 1/16" in the opposite direction, all at the rate of 1900 cycles per minute. If resistance is met, the flow pulses result in pressure pulses.

Because of line expansion, line losses and the like, as well as the high frequency of the pulses, maximum pressure readings in cylinders 69 and 70, when vibrating only, may be substantially less than the 5000–6000 p.s.i. capability of pump 25. In a typical case, the maximum readings in cylinders 69 and 70 may drop as low as 2500 p.s.i. or less. Experience has shown that such pressure levels are usually more than adequate to effect the desired results, particularly so because the flows resulting in the pressures are supplied in a pulsing or vibratory fashion.

"Frozen" or "cemented" track is readily broken free under such heavy-duty, high-frequency pulsation, particularly when applied in combination with the non-pulsating flows of the lining circuit.

Breaking loose "cemented" track is only one function of the vibratory circuit. Once the rail assembly is broken loose and the lining circuit is employed to shift the rail assembly to the desired new location, the vibratory circuit is employed to vibrate the assembly, usually both during and after the lining operation. The rock ballast is, of course, disturbed during the "throw." Moreover, the rock immediately under the ties tends to "indent" itself into the ties and to be dragged along or rotated as the ties are shifted. The net effect is to create an incipient tendency for the rail assembly to spring back to or towards its former position. Vibration during and/or after the "throw" largely eliminates this problem and the errors associated both with it and the ineffective measures previously taken to compensate for it. In addition, vibration after the "throw" settles the rail assembly and, in a sense, "cements" it in its new position, so as to resist any further undesired shifting.

Another feature of this embodiment of the present invention is the fact that when the vibratory circuit is actuated during the lining operation, the pressure pulses are unidirectional, that is, only in the direction of the throw but as soon as the throw is completed and the lining circuit disconnected, the pressure pulses become bi-directional, that is, back and forth in opposed directions, and may even increase in maximum amplitude, depending upon the rating of the vibratory pump, frequency, line losses, and the like.

This is readily apparent from the hydraulic circuitry of FIGURE 11 (as well as FIGURE 15, discussed hereinafter). When both lining valve 111 and vibrator valves 139 and 140 are actuated, pressure relief valve 108, which is typically set at about 3500 p.s.i., is in the combined circuit, thereby tending to limit peak pressures. Because of the high frequency of the vibratory pulse, line losses and the like, valve 108 doesn't necessarily or usually limit peak pressure in cylinders 69 and 70 to 3500 p.s.i. In a typical instance the pressure may be as high as 4500 p.s.i. or higher. It will also be noted that the lining cylinder opposite that being employed for the lining operation is connected directly to reservoir 24 via lock valve 115, lining valve 111, line 112 and associated lines. Hence, the side of vibratory pump 25 which is connected to the unused cylinder via its respective vibrator valve is also connected to the reservoir. Accordingly, the flow from pump 25 can build up pressures only in the cylinder doing the lining because it is only in such cylinder that resistance to flow is met.

As soon as the lining circuit is disconnected by returning spool 111a of lining valve 111 to its neutral position, then the two circuits are isolated and pressure relief valve 108 no longer can influence the vibratory circuit. In addition, neither of the vibrator valves are connected to reservoir 24, via lock valve 115 and lining valve 111. Accordingly, pulsating flows can alternately enter both cylinders 69 and 70 so as to get a truly bi-directional vibratory action.

*Description of embodiment of FIGURES 12–15*

As aforementioned, the embodiment of FIGURES 12–15 differs from that of FIGURES 1–11 primarily in that vertical pulsation or vibration, rather than oscillation, is combined with front-end loading to imbed the anchoring element or spud. Vibration, rather than oscillation, of the spud has very substantial advantages and complements the pulsating forces employed during the lining operation, particularly with respect to tamping the ballast and filling voids around the ties. This contrasts with disruption of the ballast adjacent the spud when the spud is oscillated.

Vertical vibration also results in a far-more-rapid emplacement of the spud. Faster emplacement results both because the rate of penetration into the ballast is greater for a given front-end loading and less penetration is required to achieve a given anchoring effect. Less penetration is required because vertical vibration settles and "solidifies" the ballast around the entering spud, rather than disrupting and loosening it. Another advantage for vertical vibration arises from the fact that when the spud is withdrawn, little or no hole remains in the ballast, particularly when vertical vibration is employed during withdrawal also.

To achieve vertical vibration only minor modifications of the embodiment of FIGURES 1–11 are required, which modifications also advantageously simplify the hydraulic circuitry. Comparing FIGURES 12 and 13 with roughly-equivalent FIGURES 3 and 4, it is apparent that, in general, the primary differences in the two embodiments include elimination of the oscillatory cylinders 53 and 54 and associated structures, modification of the spud guide which no longer has to oscillate, the mounting of vibrators adjacent the upper extremity of the spud and corresponding modification of the spud itself. Additional advantageous innovations include the substitution of a hydraulic piston-cylinder for the pin-and-aperture arrangement to effect vertical positioning of the spud with respect to the spud guide, the outward relocation of the hydraulic piston-cylinders used to lower and raise carrier 40, and other minor structural modifications within the skill of the art dictated by design expediency.

In FIGURES 12–15, the same reference numerals are used as in FIGURES 1–11 where the particular item has not been significantly modified. Where slight modifications have occurred but functional operations remain substantially unchanged, the same reference numerals with accompanying prime marks are employed. Otherwise, new reference numerals are employed.

Referring to FIGURES 12 and 13, the anchoring means comprises vertical shaft or spud 200, which in this embodiment is formed from a high-strength H-section with pointed sides 201 at the lower extremity to facilitate penetration of the rock ballast 9. Spud 200 is mounted for vertical sliding movement within and through spud guide 202, which may optionally include forward and rear roller supports 202a and 202b, respectively, to maintain correct alignment. Spud guide 202 is in turn slidingly supported on transverse members 40a and 40b of carrier 40 and is moved with respect thereto by the pistons or rams 73 and 74 of hydraulic cylinders 69 and 70, respectively, which bear thereagainst. Thus, as in the embodiment of FIGURES 1–11, carrier 40 and the forward part of the track liner are moved laterally with respect to spud 200, spud guide 202 and associated structures when hydraulic cylinders 69 or 70 are activated.

The vertical position of carrier 40 with respect to vertical front members 13 and 14 is adjustable by means of double-acting hydraulic cylinders 31′ and 32′, the head ends of which are secured to mounting extensions 29′ and 30′, respectively, of horizontal member 16b and the pistons 38′ and 39′ of which are secured to the side wings of support members 40c′ and 40d′ by means of holders 41′ and 42′, respectively. It is apparent from the geometry of the structure that as pistons 38′ and 39′ are extended below cylinders 31′ and 32′, respectively, frame 40 and associated structures, including spud guide 202, are lowered relative to the track liner as a whole. Prior to spud emplacement, pistons 38′ and 39′ are normally retracted within cylinders 31′ and 32′ so that the lower extremity of the spud is well above the ties and other obstructions likely to be encountered during propulsion.

The vertical position of spud 200 relative to spud guide 202 and frame 40 is adjustable by means of double-acting hydraulic cylinder 203, the head end of which is fixedly secured to spud 202 adjacent the upper extremity thereof and the piston 205 of which is secured to spud guide 202 by ball-and-socket holder 206. It is apparent that as piston 205 is retracted into cylinder 203, spud 200 is lowered relative to spud guide 202 and frame 40. Prior to spud emplacement, piston 205 is normally fully extended from cylinder 203 so that the spud is fully raised.

On side channels of spud 200 adjacent the upper extremity thereof are mounted vibrator assemblies 210 and 211, which respectively comprise hydraulic motors 212 and 213, coupling units 214 and 215 and vibrators 216 and 217. Hydraulic motors 212 and 213 may be of conventional design, one of which rotates clockwise and the other counterclockwise. Coupling units 214 and 215 may also be of conventional design known to those skilled in the art. Vibrators 216 and 217 may simply comprise rotatable eccentrically-weighted shafts, one particular form of which is shown in section in FIGURE 14.

Referring to FIGURE 14, the vibrator comprises housing 220, in which keyed shaft 221 is rotatably mounted on heavy-duty bearings 222 and 223 of suitable design, e.g., roller-type bearings. Fixedly secured to shaft 221 by mounting means 224 is arm 225, at one extremity of which weight 226 is secured. The vibrator may be mounted on spud 200 by means of bracket 227; and a hydraulic motor and coupling unit may be connected to shaft 221 by keying to the protruding extension thereof.

When weight 226 is rotated by shaft 221, centrifugal forces are set up which would be transmitted to the structure on which the vibrator is mounted. In the present embodiment, two such vibrators are mounted a the same horizonal level on spud 200 and are designed to rotate at the same speed and in phase but in opposite directions. This is readily accomplished by using identical but "mirror-image" vibrator assemblies and driving same by the same hydraulic pressures and flow rates.

The identical weights in each vibrator, which typically may weigh 4 to 6 pounds, hang vertically downward in a quiescent condition, are started simultaneously in opposite directions and are subjected to the same driving forces. As a result, they have a natural affinity for remaining constantly in phase although in opposite directions. The net effect is to cancel out all horizontal components of the centrifugal forces and to add together the vertical components. Thus spud 200 is alternately subjected to downward and upward vertical pulsations or vibrations, the magnitude of which depend primarily upon the weight of the rotating weights, the effective length of the supporting arms and the speed of rotation. As a typical example, two 5-pound weights rotating at an effective radius of 4 inches at 4500 revolutions per minute would result in successive vertical pulsations in alternate directions having a peak magnitude of 23,160 pounds.

The hydraulic fluid for actuation of hydraulic motors 212 and 213 is supplied from a common source (not shown) via line 230, which enters a junction box and splits off into two equal flow lines 231 and 232. The fluid is returned from motors 212 and 213 to the main reservoir via lines 233 and 234, respectively, which join via a junction box into line 235. The hydraulic fluid for double-acting cylinder 203 is routed via hydraulic lines 236 and 237.

In actual operation, the vibratory forces are applied to spud 200 when the spud is already vertically loaded by the weight of the front end of the track liner. As previously indicated in connection with the embodiment of FIGURES 1–11, spud carrier 40 and spud 200 are first lowered by actuating cylinders 31′ and 32′ until the vertical downward force on spud 200 exceeds the weight of the front end of the track liner. At such point further actuation of cylinders 31′ and 32′ results in the lifting of the entire front end so that the full weight thereof bears upon spud 200. This loading coupled with the vertical vibratory forces of vibrator assemblies 210 and 211 results in the rapid emplacement of spud 200 in the ballast so that the lining operation already described may proceed.

If the rams 38' and 39' of cylinders 31' and 32' are fully extended and the imbedded spud still does not provide an adequate anchor, the spud may be imbedded still deeper into the ballast and sub-surface by actuating cylinder 203 and vibrator assemblies 210 and 211, preferably simultaneously. Ram 205 is thus retracted into cylinder 203 so as to raise the front end of the liner still further relative to spud 200, which at the same time is being driven deeper by the combination of the weight of the front end and the downward pulsations of the vibrators.

*The hydraulic circuitry of FIGURE 15*

The hydraulic circuitry of the embodiment of FIGURES 12–14, which advantageously permits vibration for spud insertion as well as track lining, is shown schematically in FIGURE 15. Much of the circuitry is substantially identical as that shown in FIGURE 11, and a description thereof is not repeated here.

In FIGURE 15, hydraulic fluid from reservoir 24 enters main circuit multiple spool valve 84 via main circuit pump 80, line 81, check valve 82 and line 83. As before, sections 85 and 86 control the propulsion motor and turntable, respectively. Section 87 controls flow of hydraulic fluid to lifting cylinders 31' and 32'' and thus the vertical movement of carrier 40 relative to the track liner as a whole. Section 88' controls the flow of hydraulic fluid to cylinder 203 and thus the vertical movement of spud 200 relative to frame 40. Section 89' controls the flow of hydraulic fluid to vibrator motors 212 and 213 and thus the actuation of vibrators 216 and 217 for spud insertion.

When piston or ram 205 is to be retracted into cylinder 203 by actuation of section 88' of valve 84, hydraulic fluid flows via line 236 to the lower end of cylinder 203 and hydraulic fluid from the upper end flows back to valve 84 via line 237. When piston 205 is to be extended out of cylinder 203, the flow directions are reversed.

When the vibrator motors 212 and 213 are to be actuated, hydraulic fluid flows from valve 84 via line 230 and splits into two equal flows in lines 231 and 232 before entering the respective motors. Effluent hydraulic fluid is routed via lines 233 and 234, which join to form line 235, to reservoir 24.

It is apparent from a comparison of the hydraulic circuits of FIGURES 11 and 15 that vibration for spud insertion as shown in FIGURE 15 not only has significant operating advantages but also substantially simplifies the hydraulic circuitry. Specifically, hydraulic cylinders 53 and 54 and associated structures are eliminated. This permits the further elimination of selector valve 90, unloading valve 118, flow regulator 123, speed reducer 127, oscillatory valve 130 and associated lines and connections. The only additional circuitry present in FIGURE 15 is that required for spud vibrators. The circuit for cylinder 203 of FIGURE 15 merely replaces the circuit for cylinder 50 (not shown in FIGURE 11), which in the embodiment of FIGURES 1–11 controls the insertion and removal of pin 49 from the apertures 44 of spud 43.

The substantial reduction in hydraulic circuitry of the embodiment of FIGURES 12–15 results in a lower initial cost and reduced subsequent maintenance costs and down time. These advantages are in addition to the substantial operating advantages associated with vibration for spud insertion, already enumerated.

*Recapitulation of operation*

Typical operations of the track-liner embodiments just described are now briefly recapitulated. For example, the track liner as a whole is placed on the railway track from offset rails by means of the hydraulically-controlled turntable cylinder or jack located underneath the vehicle at or adjacent to the center of gravity. Such turntable is actuated by control valve 86 of multiple valve 84. The vehicle is then self-propelled to the site of the lining operation by actuating control valve 85 of multiple valve 84, which supplies hydraulic fluid to the hydraulic propulsion motor. At the lining site the vehicle is braked to a halt by actuating valve 99 so that hydraulic fluid is supplied to brake cylinder 102. The vehicle is thus positioned so that spud 43 of the embodiment of FIGURES 1–11 or spud 200 of the embodiment of FIGURES 12–15 may be properly embedded in the intertie ballast.

Spud 43 or spud 200 is imbedded by lowering carrier 40 by actuating control valve 87 of multiple valve 84, which results in hydraulic fluid being supplied to cylinders 31 and 32 or cylinders 31' and 32' so as to extend pistons 38 and 39 or pistons 38' and 39', respectively. In either embodiment the spud is pressed into the ballast until the forward port of the vehicle is lifted upwards and supported on the spud with wheels 10a and 10b being free of the track. Valve 89 or 89' is then actuated so that the spud is either oscillated back and forth or vibrated vertically so as to work it into the ballast and thereby provide a force-resisting or anchoring means.

If insufficient depth is achieved with pistons 38 and 39 fully extended in the embodiment of FIGURES 1–11, another "bite" on spud 43 may be taken by actuating valve 89 of multiple valve 84, so as to withdraw pin 49 from a lower aperture 44 in spud 43, raising carrier 40 by actuating control valve 87 of cylinders 31 and 32 so that pistons 38 and 39 are raised, then reinserting pin 49 in a higher aperture in spud 43 and repeating operations so that the spud is driven deeper into the intertie ballast. If insufficient depth is achieved with pistons 38' and 39' fully extended in the embodiment of FIGURES 12–15, valves 88' and 89' can be actuated to raise the carrier 40 and the front end of the track liner relative to the spud while the spud is vibrated deeper into the intertie ballast (a simpler and faster operation as compared with the other embodiment). The apparatus, with full weight of the front of the vehicle on the spud and the rear of the vehicle pivoted on the rails by wheels 11a and 11b, is then ready for the lining operation.

Thrust shoes 65 or 66 are quickly brought into contact with rails 6 or 5, respectively, depending on the direction of throw, by actuating lining valve 111 whereby hydraulic fluid at the rate of 7 gallons per minute is pumped to either cylinder 69 or 70. When the required pressure builds up to about 1000 p.s.i., the rate is automatically cut to 3.5 gallons per minute to permit an accurate "throw." Simultaneously, vibrator valves 139 and 140 may be actuated so that pulses of hyldraulic fluid are also supplied to the lining cylinder, whereby the rail assembly is subjected to a combination of non-pulsating and pulsating forces.

After the "throw" is complete as determined by observer sighting or by conventional lining gauge apparatuses, lining valve 111 is returned to neutral, and the rail assembly is vibrated in its new position so as to settle the rock ballast and the rail assembly therein. This completes the lining operation, and the track liner may be moved to the next lining point aftr lowering wheels 10a and 10b to the rails, withdrawing the spud, and the like, the procedures for so doing being manifest from the above description. In the embodiment of FIGURES 12–15, the spud may be vibrated during withdrawal, thereby still further settling the rock ballast and the rail assembly therein.

From the above detailed description of two specific embodiments, it is apparent that the objects of this invention have been achieved. Specifically, an apparatus is provided which is capable of applying heavy forces to effect the accurate shifting and placement of objects such as railway track and to settle them in place so that there is little tendency for further movement. This is accomplished by an apparatus which is capable of independently applying, alone or in combination as desired, both non-pulsating and pulsating forces to the object to be moved and resettled. When the pulsating forces are applied in combination with the non-pulsating forces, the pulsating forces are in the same direction. When applied alone, the pulsating forces are bi-directional, i.e., in two opposed directions. The apparatus is further characterized by a rate of movement which is automatically and inversely responsive to the forces required to effect same. Finally, in a preferred embodiment, a method and apparatus are provided wherein complementary vibratory or pulsating forces are employed during both anchor emplacement (and removal) and track lining whereby ballast settlement is enhanced and subsequent track shifting or "springback" is further minimized.

In a typical track-linking operation with apparatus and methods of the prior art it was not unusual for "springback" to approximate as much as one-third to one-half of the actual "throw," e.g., a 1½-inch "springback" in a "throw" of 3 inches. With the present invention "springback" seldom exceeds ⅛ inch. Moreover, this is accomplished without any vibratory or pulsating impingement of the thrust shoes 65 or 66 against the base flanges of the rails. Such impingement is undesired because the repeated blows could damage the rails.

Pulsating impingement is avoided because, as aforementioned, during application of both pulsating and non-pulsating forces to a base flange of a rail, the pulsating force is unidirectional in the same direction as the non-pulsating force. Thus, the thrust shoe never leaves the base flange. During application of the bi-directional pulsating force alone, which occurs after the track is shifted, the thrust shoe still does not leave the base flange because the "springback" tendency, even though slight (e.g., about ⅛ inch), is greater than the vibratory movement of the thrust shoes (eg., about 1/16 inch) and fast enough to follow same.

While the track-liner embodiments have been described with particular reference to specific designs, such designs are merely illustrative, and the inventive concept is not necessarily limited thereto. Many alternative modifications will be apparent from the above description to those skilled in the art. As an example, the embodiments just described employ oscillation or vibration to imbed the spud, whereas other techniques capable of imbedding the spud may also be employed. As another example, while opposed thrust shoes are used as the force-applying means and only one is normally in contact with the rail, both shoes may alernatively engage the rail assembly and/or one or both may be operatively secured thereto so as to be capable of pulling it as well as pushing it. These and other alternatives are considered within the spirit and scope of the present invention.

Having described the invention, what is claimed is:

1. Apparatus for lining railway track, said apparatus being mounted on a vehicle movable along said track and operable to slide the track with attached ties horizontally over the supporting ballast in a direction transverse to the direction of the track, comprising in combination:
   (a) a substantially vertical anchoring shaft;
   (b) means for imbedding at least a substantial portion of said anchoring shaft in the ballast between the ties and intermediate the rails;
   (c) a first thrust means intermediate said anchoring shaft and one of said rails, said thrust means having engaging surfaces for application of transverse forces to the rail;
   (d) a second thrust means intermediate said anchoring shaft and the other of said rails, said thrust means having engaging surfaces for application of transverse forces to said other of said rails;
   (e) a first hydraulic piston-cylinder means interconnected between said anchoring shaft and said first thrust means;
   (f) a second hydraulic piston-cylinder means interconnected between said anchoring shaft and said second thrust means;
   (g) a first hydraulic pump connectable to either said first or said second hydraulic piston-cylinder means, said hydraulic pump, when connected, providing a substantially non-pulsating flow of hydraulic fluid thereto; and
   (h) a second hydraulic pump independent of said first hydraulic pump and connectable to said first and said second hydraulic piston-cylinder means, said second hydraulic pump, when connected, providing a pulsating flow of hydraulic fluid alternately to said first piston-cylinder means and said second piston-cylinder means;

whereby the connection of said first hydraulic pump to either of said first or said second hydraulic piston-cylinder means results in transverse movement of the thrust means operatively connected thereto, relative to said anchoring shaft, and whereby the connection of said second hydraulic pump to said first and said second hydraulic piston-cylinder means results in the alternate pulsating movement of said first and said second thrust means.

2. The apparatus of claim 1 wherein said first thrust means and said second thrust means are rigidly secured to one another.

3. The apparatus of claim 1 wherein said first hydraulic pump is connectable to either of said first or said second hydraulic piston-cylinder means by hydraulic lines and including at an intermediate point in said lines a pressure-sensitive valve, said pressure-sensitive valve diverting a portion of the hydraulic fluid from said lines when the pressure in said lines reaches a predetermined level, whereby the rate of movement of said first or said second hydraulic piston-cylinder means is diminished at hydraulic pressures in excess of said predetermined level.

4. Apparatus for applying non-pulsating and pulsating forces to objects to effect movement thereof, comprising in combination:
   (a) an elongated force-resisting element;
   (b) a first energy means operatively connected to said elongated force-resisting element, said first energy means upon actuation applying a substantially non-pulsating force to said elongated force-resisting element to effect longitudinal movement thereof;
   (c) a second energy means operatively connected to said elongated force-resisting element, said second energy means upon actuation applying a pulsating force to said elongated force-resisting element to effect longitudinal vibratory movement thereof;
   (d) a force-applying element movably connected to said elongated force-resisting element, said force-applying element being movable in a direction substantially perpendicular to the longitudinal direction of said elongated force-resisting element;
   (e) a third energy means operatively interconnected between said elongated force-resisting element and said force-applying element, said third energy means, upon actuation, applying a substantially-non-pulsating force to said force-applying element to effect movement thereof relative to and in a direction substantially perpendicular to the longitudinal direction of said elongated force-resisting element; and
   (f) a fourth energy means operatively interconnected between said elongated force-resisting element and said force-applying element, said fourth energy means, upon actuation, applying a pulsating force to said force-applying element to effect vibratory movement thereof relative to and in a direction substantially perpendicular to the longitudinal direction of said elongated force-resisting element.

5. Apparatus for applying non-pulsating and pulsating forces to objects to effect movement thereof, comprising in combination:
   (a) an elongated anchoring element;
   (b) a first energy means operatively connected to said elongated anchoring element, said first energy means upon actuation applying a substantially non-pulsating force to said elongated anchoring element to effect longitudinal movement thereof;
   (c) a second energy means operatively connected to said elongated anchoring element, said second energy means upon actuation applying a pulsating force to said elongated anchoring element to effect longitudinal vibratory movement thereof;
   (d) at least two oppositely-disposed, force-applying elements movably connected to said elongated anchoring element for movement in a direction substantially perpendicular to the longitudinal direction of said elongated anchoring element;
   (e) at least two oppositely-disposed hydraulic piston-cylinder means operatively connected, respectively, to each of said oppositely-disposed force-applying elements, each of said hydraulic piston-cylinder means being disposed upon actuation by hydraulic fluid to cause movement, relative to and in a direction substantially perpendicular to the longitudinal direction of said anchoring element, of the respective force-applying element to which it is operatively connected;
   (f) a first hydraulic power means operably connectable to either of said oppositely-disposed hydraulic piston-cylinder means, said first hydraulic power means, when connected to either of said oppositely-disposed hydraulic piston-cylinder means, providing a non-pulsating flow of hydraulic fluid thereto; and
   (g) a second hydraulic power means independent of said first hydraulic power means and operably connectable to said oppositely-disposed hydraulic piston-cylinder means, said hydraulic power means, when connected, providing a pulsating flow of hydraulic fluid alternately to each of said oppositely-disposed hydraulic piston-cylinder means.

6. Apparatus for applying non-pulsating and pulsating forces to objects to effect movement thereof, comprising in combination:
   (a) a force-resisting element;
   (b) at least one force-applying element movably connected to said force-resisting element;
   (c) hydraulic piston-cylinder means operatively connected to said force-resisting element and said force-applying element and disposed, upon actuation by hydraulic fluid at elevated pressure, to cause relative movement of said force-applying element with respect to said force-resisting element;
   (d) a first hydraulic power means operatively connectable to said hydraulic piston-cylinder means, said first hydraulic power means, when connected, providing a substantially non-pulsating flow of hydraulic fluid to said hydraulic piston-cylinder means; and
   (e) a second hydraulic power means operatively connectable, separately and in combination with said first hydraulic power means, to said hydraulic piston-cylinder means, said second hydraulic power means, when connected, providing a pulsating flow of hydraulic fluid to said hydraulic piston-cylinder means; whereby simultaneous connection of said first and said second hydraulic power means to said hydraulic piston-cylinder means results in movement of said force-applying element relative to said force-resisting element and the simultaneous transmission of non-pulsating and pulsating forces to objects in contact with said force-applying element to effect movement, including vibratory movement, thereof.

7. The apparatus of claim 6 wherein said first hydraulic power means is operatively connectable to said hydraulic piston-cylinder means by a hydraulic line and including at an intermediate point in said line a pressure-sensitive valve, said pressure-sensitive valve diverting a portion of the hydraulic fluid from said line when the pressure in said line reaches a predetermined level, whereby the rate of movement of said hydraulic piston-cylinder means is diminished at hydraulic pressures in excess of said predetermined level.

8. The apparatus of claim 6 wherein said first and said second hydraulic power means are operatively connectable to said hydraulic piston-cylinder means by hydraulic lines and including a first hydraulic lock valve means in the lines intermediate said first hydraulic power means and said hydraulic piston-cylinder means and a second hydraulic lock valve means in the lines intermediate said second hydraulic power means and said hydraulic piston-cylinder means, said first and said second hydraulic lock valves hydraulically isolating said first and said second hydraulic power means from each other except when both are simultaneously operatively connected to said hydraulic piston-cylinder means.

9. The apparatus of claim 6 including pressure-relief means in said lines intermediate said first hydraulic power means and said first hydraulic lock valve, said pressure-relief means limiting the non-pulsating pressure when only said first hydraulic power means is connected to said hydraulic piston-cylinder means.

10. The apparatus of claim 9 wherein the maximum hydraulic pressure of which said second hydraulic power means is capable is substantially in excess of the pressure setting of said pressure-relief means.

11. Apparatus for applying non-pulsating and pulsating forces to objects to effect movement thereof, comprising in combination:
   (a) an anchoring element for the apparatus;
   (b) at least two oppositely-disposed force-applying elements movably connected to said anchoring element;
   (c) at least two oppositely-disposed hydraulic piston-cylinder means operatively connected, respectively, to each of said oppositely-disposed force-applying elements, each of said hydraulic piston-cylinder means being disposed upon actuation by hydraulic fluid to cause movement, relative to said anchoring element, of the respective force-applying element to which it is operatively connected;
   (d) a first hydraulic power means operably connectable to either of said oppositely-disposed hydraulic piston-cylinder means, said first hydraulic power means, when connected to either of said oppositely-disposed hydraulic piston-cylinder means, providing a substantially non-pulsating flow of hydraulic fluid thereto; and
   (e) a second hydraulic power means operatively connectable, separately and in combination with said first hydraulic power means, to said oppositely-disposed hydraulic piston-cylinder means, said second hydraulic power means, when connected, providing a pulsating flow of hydraulic fluid to said oppositely-disposed hydraulic piston-cylinder means; whereby the connection of said first hydraulic power means to either of said oppositely-disposed hydraulic piston-cylinder means results in movement, relative to said anchoring element, of the force-applying element operatively connected thereto, and whereby the connection of said second hydraulic power means to said oppositely-disposed hydraulic piston-cylinder means results in vibratory movement thereof relative to said anchoring element, the simultaneous connection of said first and said second hydraulic power means resulting in the simultaneous transmission of non-pulsating and pulsating forces to objects in contact with the particular force-applying element.

12. The apparatus of claim 11 wherein said first hydraulic power means is operably connectable to said oppositely-disposed hydraulic piston-cylinder means by hydraulic lines and including at an intermediate point in said lines a pressure-sensitive valve, said pressure-sensitive valve diverting a portion of the hydraulic fluid from said lines when the pressure in said lines reaches a predetermined level, whereby the rate of movement of said oppositely-disposed hydraulic piston-cylinder means is diminished at hydraulic pressures in excess of said predetermined level.

13. The apparatus of claim 11 wherein said first and said second hydraulic power means are operably connectable to said hydraulic piston-cylinder means by hydraulic lines and including a first hydraulic lock valve in the lines intermediate said first hydraulic power means and said oppositely-disposed hydraulic piston-cylinder means and a second hydraulic lock valve in the lines intermediate said second hydraulic power means and said oppositely-disposed hydraulic piston-cylinder means, said first and said second hydraulic lock valves hydraulically isolating said first and said second hydraulic power means from each other except when both are simultaneously operatively connected to said oppositely-disposed hydraulic piston-cylinder means.

14. The apparatus of claim 11 including pressure relief means in said lines intermediate said first hydraulic power means and said first hydraulic lock valve, said pressure relief means limiting the non-pulsating pressure when only said first hydraulic power means is connected to said oppositely-disposed piston-cylinder means and limiting the maximum cumulative non-pulsating and pulsating pressures when both said first and said second hydraulic power means are simultaneously operatively connected to said oppositely-disposed piston-cylinder means; and wherein the maximum pressure of which said second hydraulic power means is capable is substantially in excess of the pressure setting of said pressure relief means.

15. The apparatus of claim 11 including valve means for connecting said first hydraulic power means to a selected one of either of said oppositely-disposed piston-cylinder means, said valve means including pressure release means for simultaneously releasing pressure in the other of said oppositely-disposed piston-cylinder means.

16. Apparatus for lining railway track by sliding said track transversely over the supporting ballast comprising in combination:
    (a) anchoring means;
    (b) thrust means movably connected to said anchoring means, said thrust means having elements for engaging said track for application of transverse forces thereto;
    (c) a first power means operatively interconnected between said anchoring means and said thrust means, said first power means, upon actuation, applying substantially non-pulsating forces to said thrust means; and
    (d) a second power means operatively interconnected, separately or in combination with said first power means, between said anchoring means and said thrust means, said second power means, upon actuation, applying pulsating forces to said thrust means;
whereby the simultaneous application of non-pulsating and pulsating forces to said thrust means results in movement of said thrust means relative to said anchoring means and the simultaneous transmission of non-pulsating and pulsating forces to said track engaged by said thrust means to effect movement, including vibratory movement, thereof.

17. A method for lining railway track comprising rails and ties supported on particulated ballast comprising in combination the steps of:
    (a) providing an elongated anchoring means;
    (b) positioning said elongated anchoring means over intertie ballast of the rails of the track to be lined;
    (c) sufficiently imbedding said anchoring means in said intertie ballast with a portion thereof extending above said intertie ballast so as to provide an anchor for application of substantially horizontal forces thereagainst;
    (d) applying substantially-horizontal non-pulsating forces between
        (1) said portion of said anchoring means at substantially the level of said rails and
        (2) at least one of said rails, so as to effect substantially horizontal lateral movement of said track over said ballast relative to said anchoring means;
    (e) applying to at least one of said rails pulsating forces having at least substantially horizontal components in a direction lateral to said rails so as to effect horizontal, lateral pulsating movement of the track and thereby to subject the ballast supporting said track to vibrational settlement; and
    (f) thereafter withdrawing said anchoring means from said intertie ballast.

18. The method of claim 17 wherein the step of imbedding said anchoring means in said intertie ballast is effected by applying simultaneously to said anchoring means a combination of substantially vertical non-pulsating and pulsating forces, whereby said intertie ballast is simultaneously vibrationally settled about said anchoring means.

References Cited by the Examiner

UNITED STATES PATENTS

| | | | |
|---|---|---|---|
| 1,085,344 | 1/1914 | Kubat | 173—31 |
| 1,614,216 | 1/1927 | Swartz | 173—31 |
| 2,573,368 | 10/1951 | Seborg | 91—446 X |
| 2,736,268 | 2/1956 | Yohe | 104—8 |
| 2,743,585 | 5/1956 | Berthet et al. | 254—29 X |
| 2,926,616 | 3/1960 | Talboys | 104—8 |
| 2,966,122 | 12/1960 | Kropp | 104—8 |
| 2,975,846 | 3/1961 | Bodine | 74—61 X |

FOREIGN PATENTS 100,458   3/1937   Australia.

OTHER REFERENCES

Goeb et al.: German printed application 1,033,234, July 1958.

Ripper: German printed application 1,084,288, June 1960.

ARTHUR L. LA POINT, *Primary Examiner.*

LEO QUACKENBUSH, *Examiner.*